United States Patent
Jinka

(10) Patent No.: US 12,325,654 B2
(45) Date of Patent: Jun. 10, 2025

(54) STATION AND METHOD FOR FORMING GLASS SHEETS

(71) Applicant: GLASSTECH, INC., Perrysburg, OH (US)

(72) Inventor: Ashoka G. Jinka, Maumee, OH (US)

(73) Assignee: Glasstech, Inc., Perrysburg, OH (US)

( * ) Notice: Subject to any disclaimer, the term of this patent is extended or adjusted under 35 U.S.C. 154(b) by 510 days.

(21) Appl. No.: 17/732,785

(22) Filed: Apr. 29, 2022

(65) Prior Publication Data

US 2023/0348312 A1    Nov. 2, 2023

(51) Int. Cl.
C03B 23/03        (2006.01)

(52) U.S. Cl.
CPC ...... *C03B 23/0305* (2013.01); *C03B 23/0302* (2013.01)

(58) Field of Classification Search
CPC .................................................. C03B 23/0305
See application file for complete search history.

(56) References Cited

U.S. PATENT DOCUMENTS

| | | | |
|---|---|---|---|
| 6,006,549 A | 12/1999 | Savka et al. |
| 6,543,255 B2 | 4/2003 | Bennett et al. |
| 8,468,850 B2 | 6/2013 | Fukami et al. |
| 9,296,637 B2 | 3/2016 | Nitschke et al. |
| 9,981,869 B2 | 5/2018 | Olivier et al. |
| 10,246,364 B2 | 4/2019 | Nitschke et al. |
| 10,377,657 B2 | 8/2019 | Nitschke et al. |
| 10,640,411 B2 | 5/2020 | Betschart et al. |
| 10,995,028 B2 | 5/2021 | Mannheim Astete et al. |
| 11,203,545 B2 | 12/2021 | Schillings et al. |
| 2009/0199595 A1* | 8/2009 | Machura ............... C03B 23/027 65/106 |
| 2010/0236290 A1 | 9/2010 | Fukami et al. |
| 2011/0100060 A1 | 5/2011 | Tetlow |
| 2011/0247367 A1 | 10/2011 | Nitschke et al. |
| 2012/0144866 A1 | 6/2012 | Liu et al. |

FOREIGN PATENT DOCUMENTS

| | | |
|---|---|---|
| WO | 2018/178881 A1 | 10/2018 |
| WO | 2019/008495 A1 | 1/2019 |
| WO | 2019/008496 A1 | 1/2019 |
| WO | 2022/063575 A1 | 3/2022 |

OTHER PUBLICATIONS

PCT International Search Report and Written Opinion of the International Searching, Application No. PCT/US2023/20120, Applicant Glasstech, Inc., 9 Pages.

* cited by examiner

*Primary Examiner* — Cynthia Szewczyk
(74) *Attorney, Agent, or Firm* — Brooks Kushman P.C.

(57) ABSTRACT

A glass sheet forming station for forming a glass sheet may include an upper mold, a lower outer mold arrangement and a lower inner mold arrangement disposed inwardly of the lower outer mold arrangement and movable relative to the lower outer mold arrangement. The lower outer mold arrangement may include first and second outer longitudinal support portions and first and second outer lateral support portions that are each configured to contact the glass sheet. The lower inner mold arrangement may include first and second inner longitudinal support portions and first and second inner lateral support portions that are each configured to contact the glass sheet. Furthermore, the lower outer mold arrangement and the lower inner mold arrangement may each be operable to press the glass sheet against the upper mold.

23 Claims, 5 Drawing Sheets

STATION AND METHOD FOR FORMING GLASS SHEETS

TECHNICAL FIELD

The disclosure relates to a forming station and method for forming glass sheets.

BACKGROUND

Glass sheets can be formed or shaped using one or more molds. Example apparatuses and methods for forming glass sheets are disclosed in U.S. Pat. Nos. 9,981,869 and 10,377,657.

SUMMARY

A glass sheet forming station, according to the disclosure, for forming a glass sheet may include an upper mold, a lower outer mold arrangement and a lower inner mold arrangement disposed inwardly of the lower outer mold arrangement and movable relative to the lower outer mold arrangement. The lower outer mold arrangement may include first and second outer longitudinal support portions and first and second outer lateral support portions that are each configured to contact the glass sheet. The lower inner mold arrangement may include first and second inner longitudinal support portions and first and second inner lateral support portions that are each configured to contact the glass sheet. Furthermore, the lower outer mold arrangement and the lower inner mold arrangement may each be operable to press the glass sheet against the upper mold.

Further according to the disclosure, a glass sheet forming station for forming a glass sheet may include an upper mold, a lower outer ring and a lower inner ring disposed inwardly of the lower outer ring and movable relative to the lower outer ring. The lower outer ring may include first and second outer end portions and first and second outer intermediate portions positioned between the outer end portions. The outer end portions and the outer intermediate portions may each be configured to contact the glass sheet. The lower inner ring may include first and second inner end portions and first and second inner intermediate portions positioned between the inner end portions. The inner end portions and the inner intermediate portions may each be configured to contact the glass sheet. Furthermore, the lower outer ring and the lower inner ring may each be operable to press the glass sheet against the upper mold.

A method, according to the disclosure, for forming a glass sheet may include pressing the glass sheet against a mold using an outer mold arrangement having first and second outer end support portions and first and second outer intermediate support portions positioned between the outer end support portions. The method may further include pressing the glass sheet against the mold using an inner mold arrangement that is disposed inwardly of the outer mold arrangement and movable relative to the outer mold arrangement, the inner mold arrangement having first and second inner end support portions and first and second inner intermediate support portions positioned between the inner end support portions.

While exemplary embodiments are illustrated and disclosed, such disclosure should not be construed to limit the claims. It is anticipated that various modifications and alternative designs may be made without departing from the scope of the disclosure.

DETAILED DESCRIPTION

As required, detailed embodiments are disclosed herein; however, it is to be understood that the disclosed embodiments are merely exemplary and that various and alternative forms are possible. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ embodiments according to the disclosure.

Figure 1:
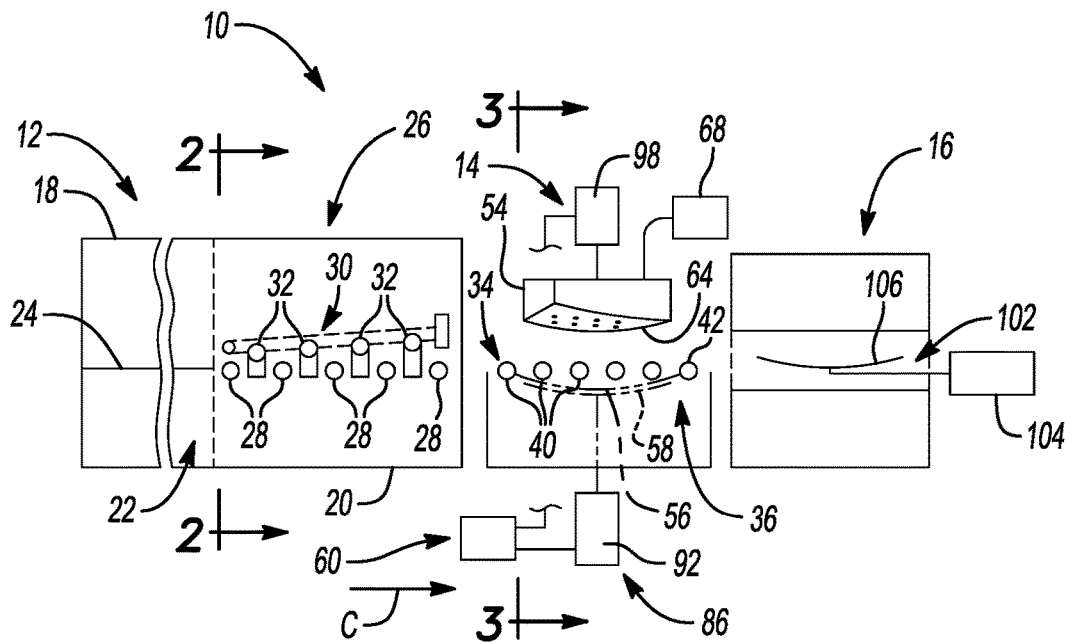
FIG. 1 is a schematic side elevation view of a glass sheet forming system or apparatus according to the disclosure, wherein the apparatus includes a heating station, a forming station located downstream in a direction of conveyance from the heating station, and an additional processing station disposed downstream of the forming station.

FIG. 1 shows a glass processing apparatus or system 10 according to the disclosure for forming glass sheets. The system 10 includes a heating station such as a furnace 12, a forming station 14 according to the disclosure located downstream in a direction of conveyance C from the furnace 12, and an additional processing station, such as a cooling station 16, disposed downstream of the forming station 14.

The furnace 12 has entry and exit portions or ends 18 and 20, respectively, and includes a heating chamber 22 having heating elements for heating glass sheets and a conveyor 24 for conveying the glass sheets along the direction of conveyance C through the furnace 12 from the entry end 18 to the exit end 20. The conveyor 24 may be any suitable conveyor, such as a roller or roll conveyor, for conveying the glass sheets during heating from ambient temperature to a sufficiently high temperature to permit forming, which may also be referred to as bending or shaping.

Figure 2:
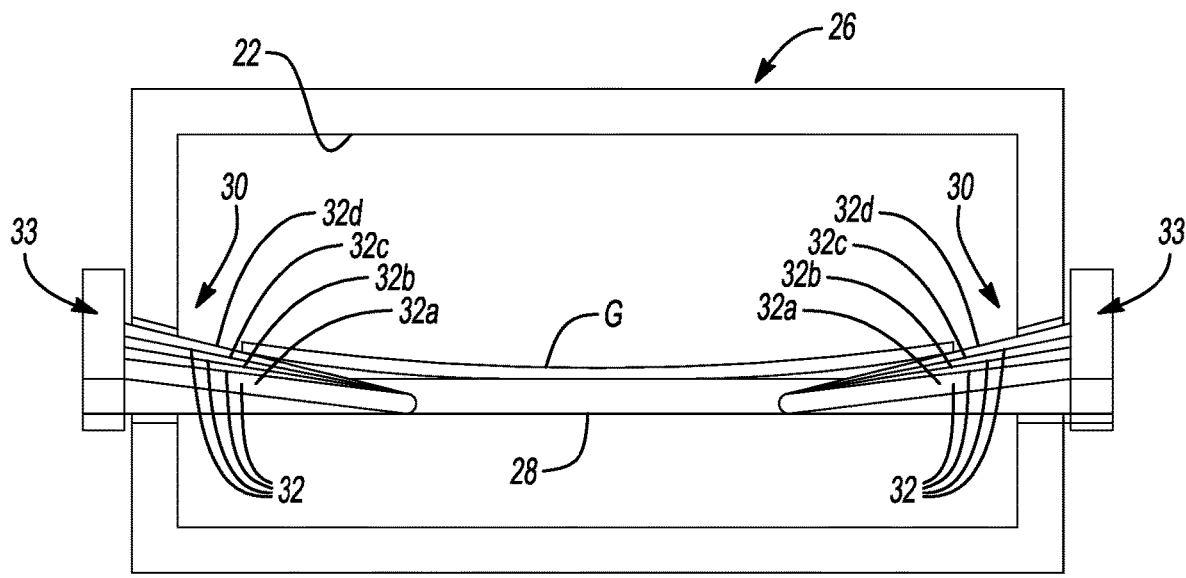
FIG. 2 is a schematic cross-sectional view of the apparatus of FIG. 1 at an exit end of the heating station, taken along line 2-2 in FIG. 1 and viewed in the direction of the arrows, and showing a roll forming arrangement on which heated glass sheets may be conveyed for initial roll forming prior to exiting the heating station in preparation for press forming in the forming station.

The furnace 12 may also include an initial forming station, such as a roll forming station 26, for performing initial forming of the glass sheets prior to the forming station 14. In the embodiment shown in FIGS. 1 and 2, the roll forming station 26 includes horizontally extending conveyor rollers or rolls 28 that are rotatively driven and spaced horizontally within the heating chamber 22 along the direction of conveyance C extending laterally with respect thereto to support and convey the heated glass sheets. The roll forming station 26 also includes a pair of sets 30 of bending rolls 32, with the bending roll sets 30 spaced laterally with respect to each other within the heating chamber 22 along the direction of conveyance C. Each set of bending rolls 32 is supported and rotatively driven by a drive mechanism 33, such as a motor and/or suitable gears, with the bending rolls at progressively increasing inclinations along the direction of conveyance as illustrated by reference numerals $32_a$, $32_b$, $32_c$ and $32_d$ in FIG. 2. The conveyance of each heated glass sheet G along the direction of conveyance in cooperation with the bending rolls 32 provides initial forming of the glass sheet G along a direction transverse to the direction of conveyance as illustrated in FIG. 2. This forming provides each glass sheet with straight line elements that may be parallel to each other in a cylindrical shape or angled with respect to each other in a conical shape. As each location of the glass sheet along the direction of conveyance is bent from its flat shape, this bending may also further bend the preceding location such that the net effect may be a slightly conical shape.

Figure 3:
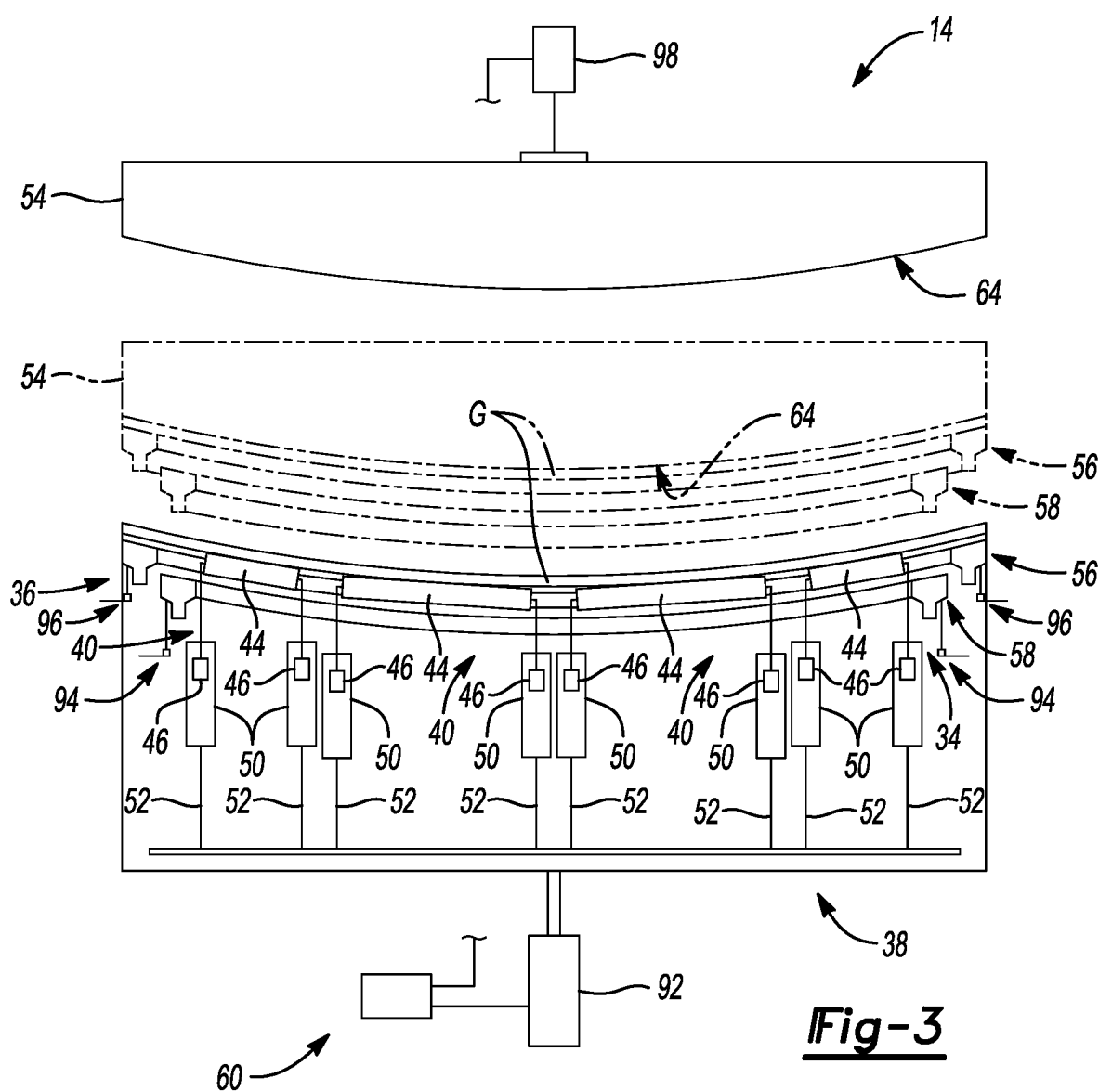
FIG. 3 is a schematic cross-sectional view through the forming station of the apparatus of FIG. 1, taken along line 3-3 in FIG. 1 and viewed in the direction of the arrows, and showing a conveyor assembly or bed for receiving heated glass sheets and a forming apparatus for forming or bending the glass sheets, wherein the forming apparatus includes an upper mold and outer and inner mold arrangements according to the disclosure.
Figure 6:
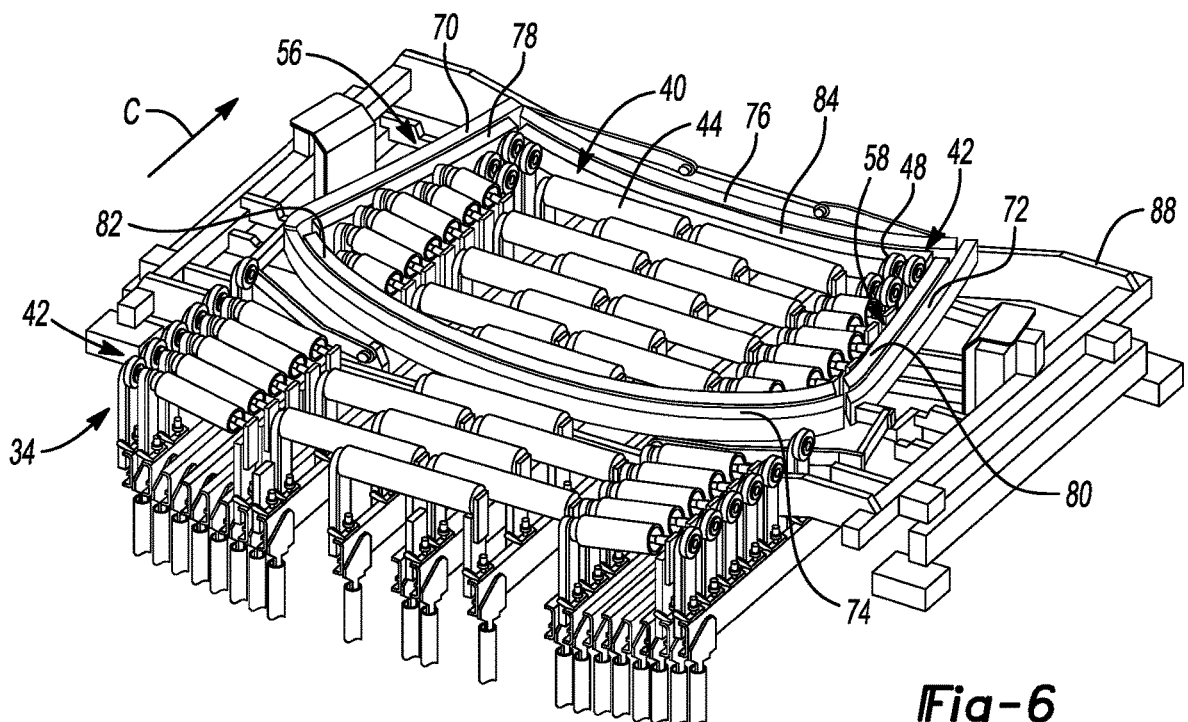
FIG. 6 is a perspective view of a lower portion of the forming station showing the conveyor bed and the outer and inner mold arrangements mounted on a tooling frame.

Referring to FIGS. 1 and 3, the forming station 14 is located externally of the furnace 12 downstream from its exit end 20 to receive the initially formed glass sheets from the roll forming station 26. In the illustrated embodiment, the forming station 14 is configured as a press forming station and includes a lower conveyor bed 34 of the conveyor 24, or another conveyor, for receiving an initially formed glass sheet to be further press formed by a forming apparatus, such as a press forming apparatus collectively indicated by 36. Referring to FIGS. 1, 3 and 6, the conveyor bed 34 includes a lower base structure or support 38 and a plurality of conveyor roller assemblies 40 and a plurality of conveyor wheel assemblies 42. Each roller assembly 40 may include a roller 44 rotatably supported by one or more support members, such as rods or arms, that each have an upper end connected to the roller 44 and a lower end including a detachable connection 46 for detachably connecting the roller assembly to the support 38. Likewise, each wheel assembly 42 may include a support member, such as a rod or arm, having an upper end that is provided with a wheel 48 and a lower end including a detachable connection 46 for detachably connecting the wheel assembly to the support 38. A drive mechanism, such as a motor and/or gears, may provide rotational driving of the roller 44 of each roller assembly 40 and the wheel 48 of each wheel assembly 42 upon connection of the roller assemblies 40 and the wheel assemblies 42 to the support 38. It should be noted, however, that the conveyor bed 34 may have any suitable configuration. For example, the conveyor bed may be provided with only roller assemblies or only wheel assemblies. Additional details of example conveyor beds may be found in U.S. Pat. No. 10,377,657 and U.S. Patent Application Publication No. 2011/0247367 A1, which are incorporated by reference in their entireties.

As shown in FIGS. 3 and 6, the conveyor bed 34 may be provided with an upwardly curved or concave shape in a direction transverse to the direction of conveyance along which the conveyor bed receives each heated glass sheet corresponding to the initially formed shape provided by the roll forming station 26 illustrated in FIGS. 1 and 2. More specifically, the lower base structure 38 of the conveyor bed 34 may include a plurality of rails 50 that extend along the direction of conveyance and have different elevations, as provided by schematically indicated adjusters 52 as shown in FIG. 3, along a direction transverse to the direction of conveyance to provide the curved or concave shape of the conveyor bed.

Referring to FIGS. 1 and 3, the press forming apparatus 36 includes an upper mold 54 and first and second mold arrangements according to the disclosure, such as lower outer and inner rings 56 and 58, respectively, that may be received in the conveyor bed 34 and are configured to press a heated glass sheet against the upper mold 54 to press form the heated glass sheet. The upper mold 54 and the rings 56 and 58 are shown in solid lines in example initial positions in FIG. 3, and in phantom lines in example final positions. In addition, the forming station 14 includes a control system 60 configured to control operation of components of the press forming apparatus 36, such as movement of the upper mold 54 and the rings 56 and 58, as well as other components of the forming station 14, such as the conveyor bed 34. The control system 60 may also be configured to control operation of other components of the system 10, such as the furnace 12 and associated conveyor 24 and forming station 26, and the cooling station 16.

Figure 4:
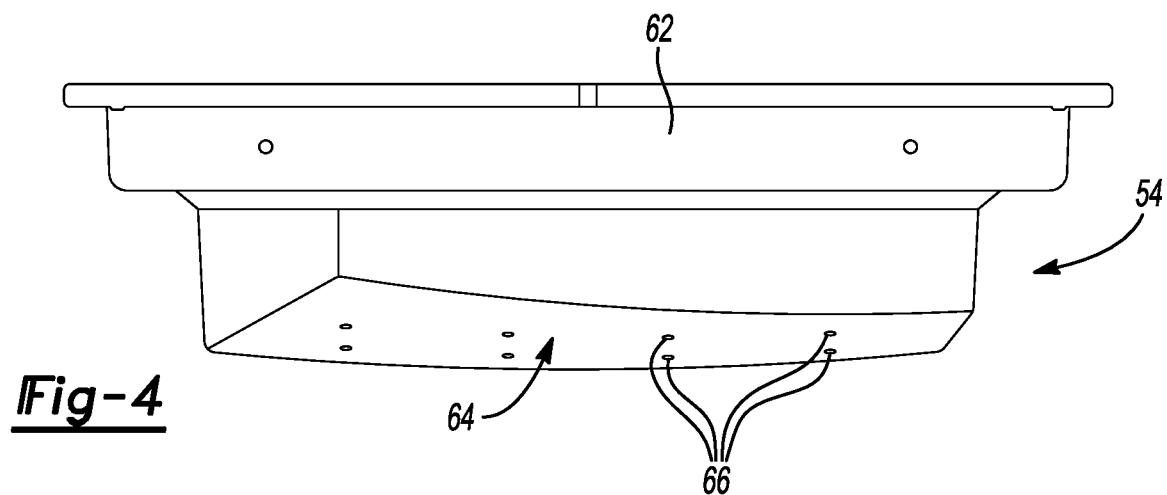
FIG. 4 is a side elevational view of the upper mold showing its downwardly facing mold surface against which glass forming in the forming station takes place.
Figure 5:
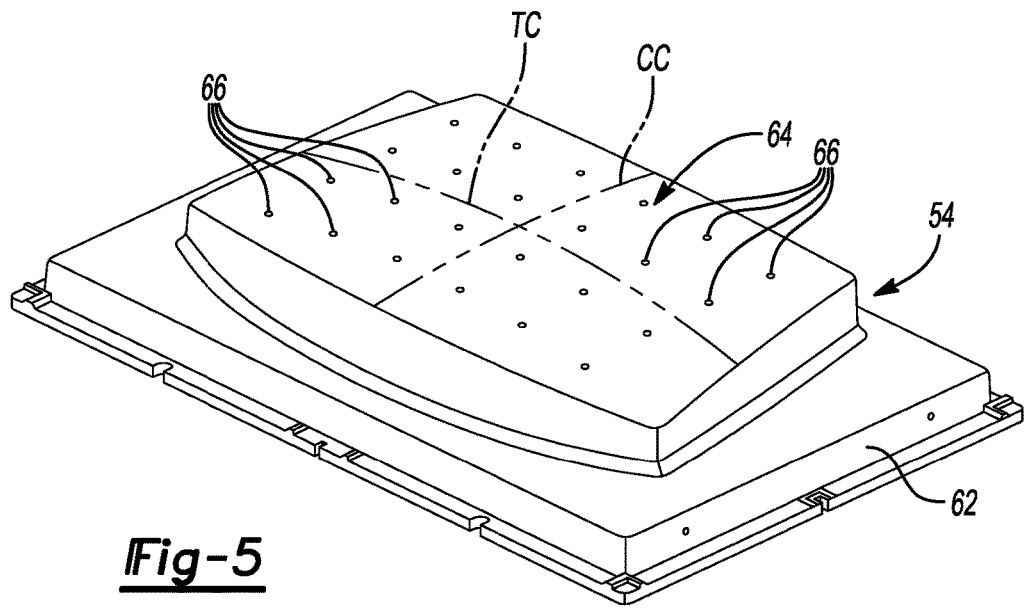
FIG. 5 is a perspective view of the upper mold turned upside down to illustrate the curvature of the downwardly facing mold surface in transverse directions both along and transverse to the direction of conveyance.

Referring to FIGS. 4 and 5, the upper mold 54 is supported on an upper mount 62 and has a forming face or mold surface 64 configured to form the glass sheet in a desired shape. While the mold surface 64 may have any suitable shape, in the illustrated embodiment, the mold surface 64 has a downwardly facing convex shape. Furthermore, the mold surface 64 may have curvature in transverse directions as illustrated by phantom line CC that is curved along the direction of conveyance and by phantom line TC that is curved along a direction transverse to the direction of conveyance, as shown in FIG. 5. The mold surface 64 may also be provided with an array of holes 66 at which a vacuum may be provided from a vacuum source 68 shown in FIG. 1 so as to support the glass sheet during and after the press forming and ensure forming of the glass sheet to the shape of the mold surface 64. In addition, the upper mold 54 may be heated to facilitate bending the glass sheet against the mold surface 64.

Figure 7:
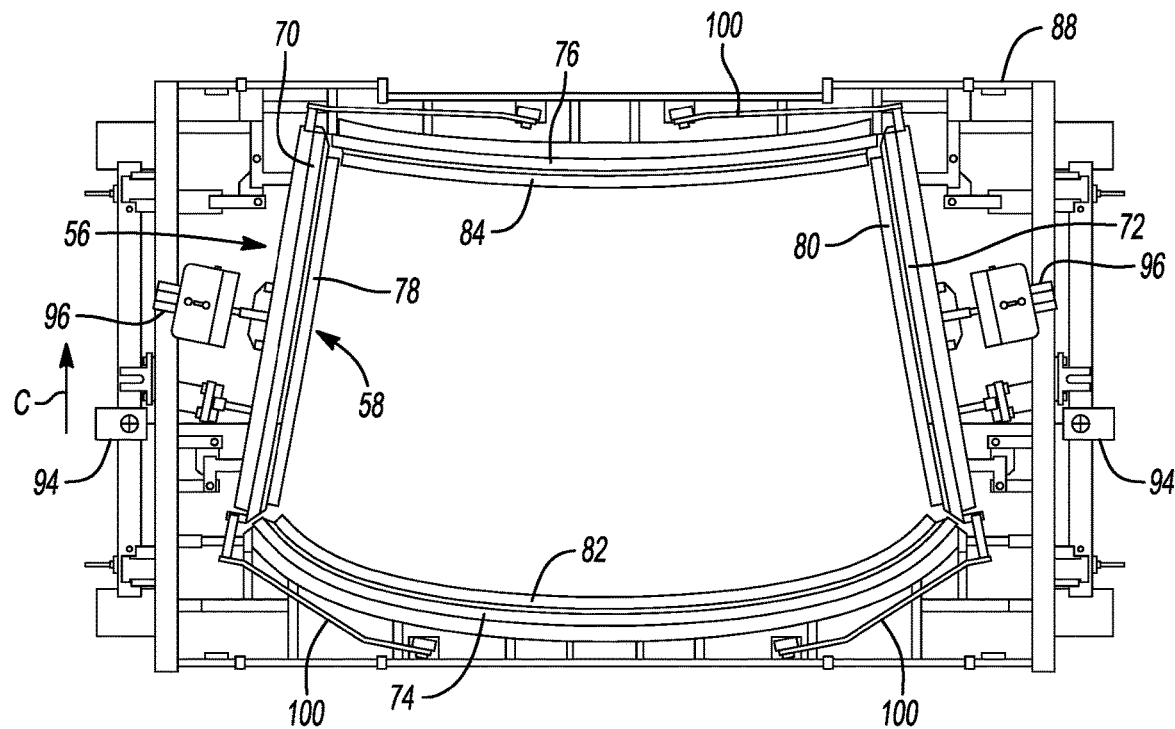
FIG. 7 is a top view of the lower portion of the forming station with the conveyor bed removed to more clearly show the outer and inner mold arrangements of the forming station.
Figure 8:
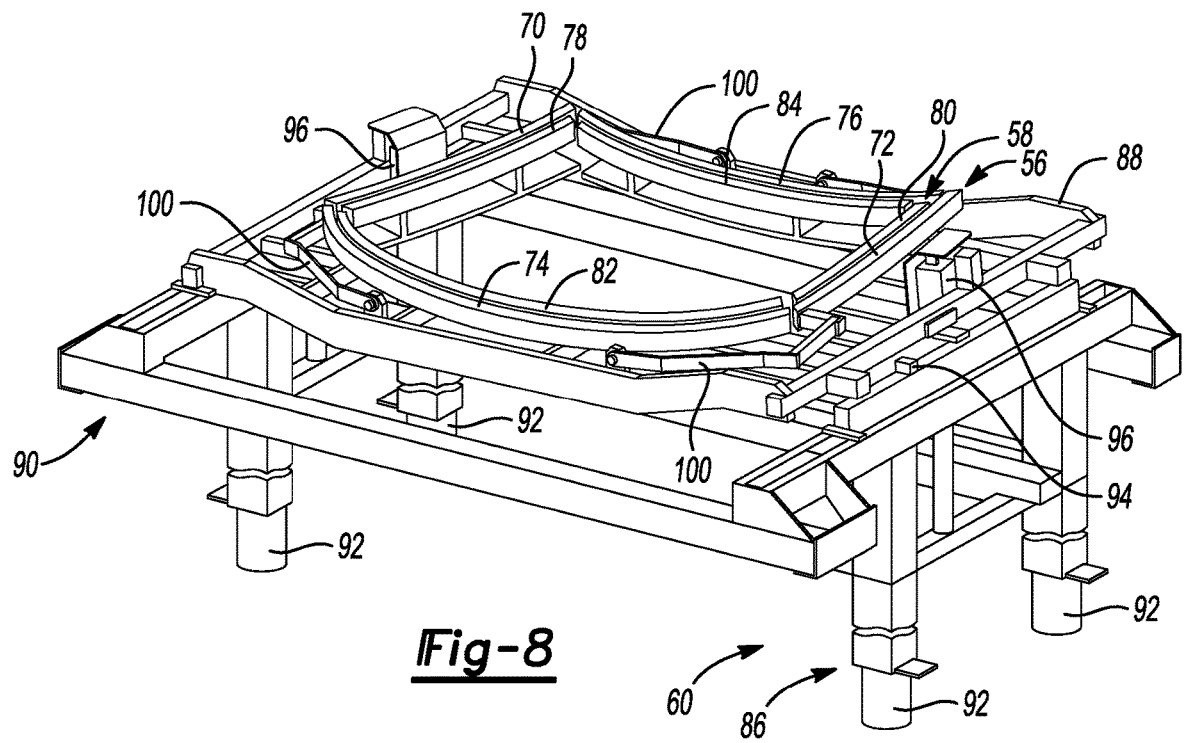
FIG. 8 is a perspective view of the lower portion of the forming station showing the outer and inner mold arrangements and various actuators for moving the mold arrangements.

Referring to FIGS. 6-8, the outer and inner rings 56 and 58, respectively, are each configured to contact the glass sheet and each ring may have a shape that is complementary to the mold surface 64 of the upper mold 54. For example, each ring 56 and 58 may generally have an upwardly concave curved shape. Furthermore, the outer ring 56 is disposed outwardly of the inner ring 58, and both rings 56 and 58 are movable with respect to each other.

The outer ring 56 includes first and second outer end mold or support portions, such as first and second outer lateral support portions 70 and 72, respectively, that are spaced apart from each other (e.g., generally laterally relative to the direction of conveyance), and first and second outer intermediate mold or support portions, such as first and second outer longitudinal support portions 74 and 76, respectively, that are spaced apart from each other (e.g., in the direction of conveyance) and that are positioned between, or extend between, the outer lateral support portions 70 and 72. The inner ring 58 is disposed inwardly of the outer ring and likewise includes first and second inner end mold or support portions, such as first and second inner lateral support portions 78 and 80, respectively, that are spaced apart from each other (e.g., generally laterally relative to the direction of conveyance), and first and second inner intermediate mold or support portions, such as first and second inner longitudinal support portions 82 and 84, respectively, that are spaced apart from each other (e.g., in the direction of conveyance) and that are positioned between, or extend between, the inner lateral support portions 78 and 80. Furthermore, each support portion 70-76 and 78-84 is configured to contact the glass sheet.

While the outer ring support portions 70-76 and the inner ring support portions 78-84 may have any suitable shape or configuration, in the illustrated embodiment, each of the support portions 70-76 and 78-84 has an upwardly concave curved shape. Furthermore, for each of the rings 56 and 58, the corresponding support portions may have any suitable width. For example, each support portion 70-76 of the outer ring 56 may have a width in a range of 5 mm to 15 mm or in a range of 8 mm to 12 mm (e.g., 10 mm), and each support portion 78-84 of the inner ring 58 may have a width in a range of 20 mm to 30 mm or in a range of 23 mm to 27 mm (e.g., 25 mm). As another example, for the outer ring 56, at least one of the first and second outer longitudinal support portions 74 and 76, respectively, may have a width that is different than a width of at least one of the first and second outer lateral support portions 70 and 72, respectively, and/or, for the inner ring 58, at least one of the first and second inner longitudinal support portions 82 and 84, respectively, may have a width that is different than a width of at least one of the first and second inner lateral support portions 78 and 80, respectively. In that regard, for each ring 56 and 58, the corresponding lateral support portions may be wider than the corresponding longitudinal support portions.

In addition, each support portion 70-76 and 78-84 may be made of any suitable material, such as steel (e.g., low-carbon steel, 304 steel, etc.) or other metal alloy, that may form a main structure or base, and the base may be a rigid structure. Each support portion 70-76 and 78-84 may also include one or more top layers positioned on the base. For example, each support portion 70-76 and 78-84 may include a thin felt layer (e.g., stainless steel mesh), which may be a compliant layer, connected to the base, and/or a contact layer (e.g., stainless steel tape), positioned on top of and connected to the thin felt layer, or positioned directly on top of and connected to the base. Furthermore, each support portion 70-76 and 78-84 may be provided with one or more heating elements (e.g., resistive heating elements) for heating a contact surface (e.g., topmost layer) of the support portion. Such heating elements may be embedded in the contact surface of each support portion and/or positioned below the contact surface, for example. Heating of the support portions 70-76 and 78-84 may be beneficial to reduce or eliminate marking of glass sheets and/or to reduce residual stresses in the glass sheets during press forming.

In one embodiment, the support portions 70-76 of the outer ring 56 may form a continuous ring, and/or the support portions 78-84 of the inner ring 58 may form a continuous ring. In another embodiment, one or more of the support portions 70-76 of the outer ring 56 may be formed as separate portions or segments and/or one or more of the support portions 78-84 of the inner ring 58 may be formed as separate portions or segments. With such a configuration, at least one of the first and second outer longitudinal support portions 74 and 76, respectively, may be movable with respect to at least one of the first and second outer lateral support portions 70 and 72, respectively, and/or at least one of the first and second outer lateral support portions 70 and 72, respectively, may be movable with respect to at least one of the first and second outer longitudinal support portions 74 and 76, respectively, and/or at least one of the first and second inner longitudinal support portions 82 and 84, respectively, may be movable with respect to at least one of the first and second inner lateral support portions 78 and 80, respectively, and/or at least one of the first and second inner lateral support portions 78 and 80, respectively, may be movable with respect to at least one of the first and second inner longitudinal support portions 82 and 84, respectively.

In the illustrated embodiment, the support portions 70-76 of the outer ring 56 are each formed as a separate portion or segment, and the support portions 70-76 are movable together with each other or independently. Likewise, the support portions 78-84 of the inner ring 58 are each formed as a separate portion or segment, and the support portions 78-84 are movable together with each other or independently.

The rings 56 and 58 may be moved toward and away from the upper mold 54 in any suitable manner. For example, referring to FIG. 1, the control system 60 may include an actuator system 86 having one or more actuators for moving the support portions 70-76 of the outer ring 56 independently or together, and one or more actuators for moving the support portions 78-84 of the inner ring 58 independently or together. For example, the actuators may be electric, hydraulic and/or pneumatic actuators, such as servomechanisms or servomotors and associated gears, linkages, etc. In the embodiment shown in FIGS. 6-8, the rings 56 and 58 are movably mounted on a tooling frame 88, the tooling frame 88 is supported on a support structure, such as a support frame 90, and the actuator system 86 includes one or more first actuators 92 for moving the support frame 90 and the tooling frame 88 upwardly and downwardly so as to move the rings 56 and 58 upwardly and downwardly. The actuator system 86 further includes one or more second actuators, such as inner ring actuators 94, that are operable to move the inner ring 58 with respect to the outer ring 56 and the tooling frame 88, and one or more third actuators, such as outer ring actuators 96, that are operable to move the outer ring 56 with respect to the inner ring 58 and the tooling frame 78. For example, the actuator system 86 may include one or more inner ring actuators 94 for each support portion 78-84 of the inner ring 58 for moving the support portions 78-84 independently or together, and one or more outer ring actuators 96 for each support portion 70-76 of the outer ring 56 for moving the support portions 70-76 independently or together. In the illustrated embodiment, the inner ring actuators 94 are mounted on the support frame 90 beneath the tooling frame 88, and the outer ring actuators 96 are mounted on the tooling frame 88. In addition, referring to FIG. 1, the actuator system 86 may include one or more mold actuators 98, such as described above, for moving the upper mold 54 upwardly and downwardly.

The control system 60 mentioned above may include any suitable hardware and/or software for controlling operation of the forming station 14 (e.g., the conveyor 34, the press forming apparatus 36) in order to perform press forming of glass sheets (e.g., for performing the particular algorithms represented by the functions described herein), as well as for controlling operation of other components of the system 10 such as the furnace 12 and associated conveyor 24 and forming station 26, and the cooling station 16. For example, the control system 60 may include one or more processors in communication with one or more storage devices or memory units, which include computer readable program instructions that are executable by the one or more processors so that the control system 60 may control operation of the furnace 12, the forming station 14, the cooling station 16, etc. The control system 60 may also, or instead, include one or more application specific integrated circuits, programmable gate arrays, programmable logic devices, and/or digital signal processors. Furthermore, the control system 60 may communicate with the above components through wired connections and/or wireless connections.

Additional examples of features of the press molding apparatus 36, such as the upper mold 54 and actuator systems, may be found in U.S. Pat. No. 10,377,657 B2, which is incorporated by reference in its entirety.

Figure 9:
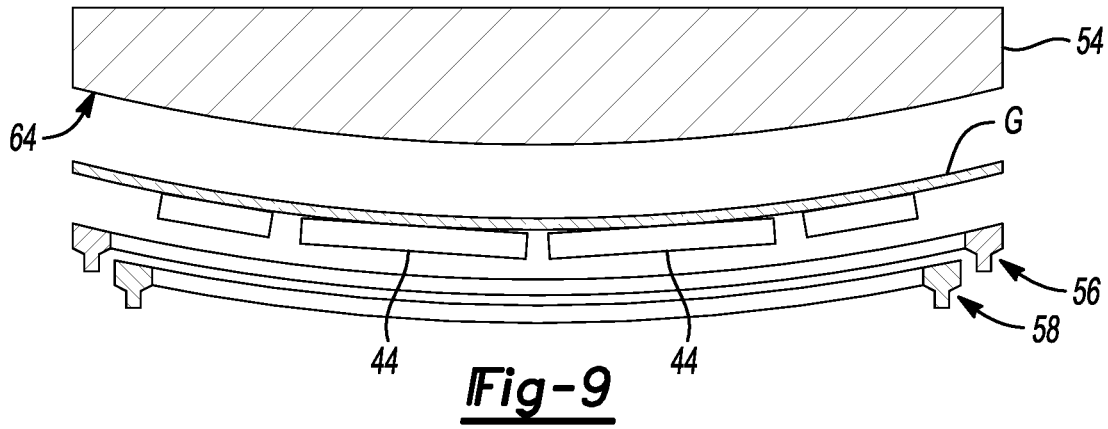
FIG. 9 is a schematic view of the forming station viewed in the direction of conveyance and showing an initially formed glass sheet positioned on the conveyor bed below the upper mold and above the outer and inner mold arrangements.

Referring to FIGS. 1 and 7-12, an example press forming cycle in the forming station 14 will now be described. The press forming cycle may begin as an initially formed glass sheet G is conveyed on the conveyor bed 34 from the roll forming station 26 into the forming station 14 above the rings 56 and 58 and below the upper mold 54, as shown in FIG. 9. The initially formed glass sheet G may then have upper end portions with straight line elements and an intermediate portion that also has straight line elements as previously discussed.

Figure 10:
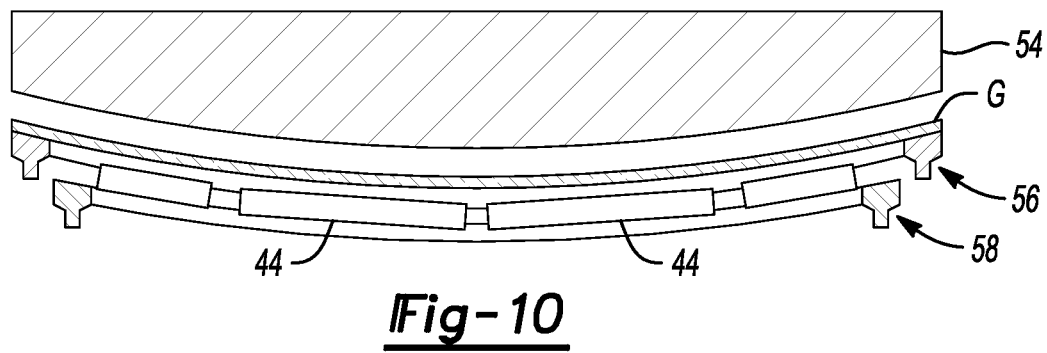
FIG. 10 is a schematic view similar to FIG. 9 but showing a later stage of a press forming cycle after the outer mold arrangement has moved upwardly to lift the initially formed glass sheet upwardly off the conveyor bed into proximity with the downwardly facing mold surface of the upper mold.

Next, referring to FIGS. 1, 8 and 10, the control system 60 may operate to move the outer ring 56 upwardly to contact the glass sheet G and lift the glass sheet upwardly off of the conveyor bed 34 and toward the upper mold 54. For example, the control system 60 may operate the first actuators 92 to move the support frame 90 and the tooling frame 88 upwardly to move the outer and inner rings 56 and 58, respectively, upwardly, but the inner ring 58 may be offset downwardly with respect to the outer ring 56 so that the inner ring 58 does not contact the glass sheet G, as shown in FIG. 10. Alternatively or supplementally, the control system 60 may operate the inner ring actuators 94 to move the inner ring 58 downwardly with respect to the outer ring 56 and the tooling frame 88, as the tooling frame 88 is being moved upwardly, so that the inner ring 58 does not contact the glass sheet G. As a result, the inner ring 58 may also be moved upwardly, but remain spaced away from the glass sheet G. The control system 60 may also operate to lower the upper mold 54 toward the rings 56 and 58 in order to reduce overall cycle time. For example, the control system 60 may operate the mold actuator 98 to lower the upper mold 54.

Figure 11:
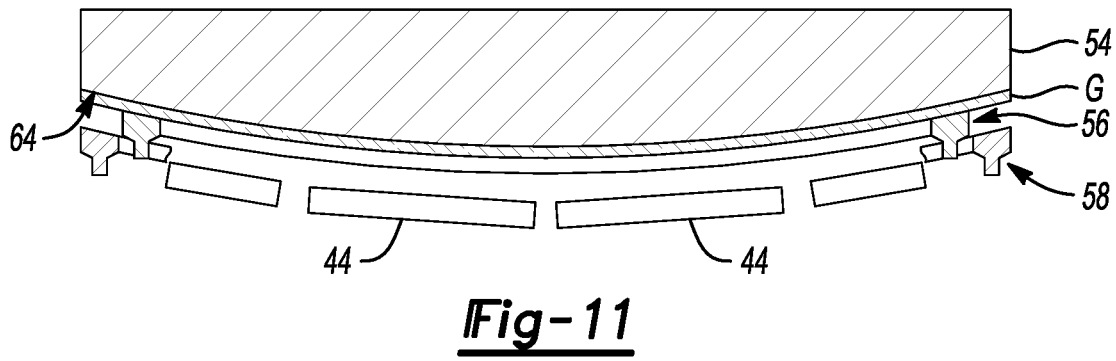
FIG. 11 is a schematic view similar to FIG. 10 but showing a still later stage of the press forming cycle after the inner mold arrangement has been raised upwardly relative to the outer mold arrangement to press the glass sheet against the upper mold.

Referring to FIGS. 8 and 11, once the glass sheet G has been moved proximate the upper mold 54 (e.g., within a range of 0.1 to 0.5 cm of the upper mold 54), the control system 60 may operate to move the inner ring 58 upwardly relative to the outer ring 56 to contact the glass sheet G and lift the glass sheet upwardly off of the outer ring 56 and press the glass sheet against the upper mold 54, as shown in FIG. 11, with the outer ring 56 now spaced away from the glass sheet G. For example, the control system 60 may stop operation of the first actuators 92 to stop movement of the tooling frame 88, and operate the inner ring actuators 94 to move the inner ring 58 with respect to the tooling frame 88 and the outer ring 56. As another example, the control system 60 may continue operation of the first actuators 92 so that both rings 56 and 58 continue to be moved toward the upper mold 54, and also operate the inner ring actuators 94 so that the inner ring 58 moves upwardly relative to the outer ring 56. As a result, the inner ring 58 may press an inner or intermediate portion of the glass sheet G (e.g., a portion of the glass sheet disposed inwardly from the outer periphery of the glass sheet) against the upper mold 54, and form that portion of the glass sheet to the shape of the mold surface 64. In addition, the control system 60 may operate the vacuum source 68 so that vacuum may be drawn at the mold surface 64 through the vacuum holes 66 in order to assist in forming the glass sheet G and/or retaining the glass sheet against the mold surface 64.

Figure 12:
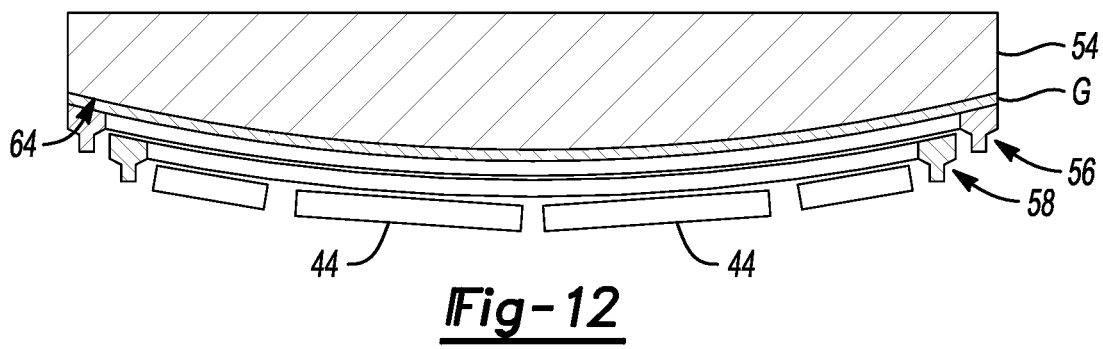
FIG. 12 is a schematic view similar to FIG. 11 but showing a later stage of the press forming cycle in which the outer mold arrangement has been moved upwardly toward the upper mold to press a peripheral portion or portions of the glass sheet against the upper mold, and the lower mold arrangement has been lowered away from the glass sheet.

Subsequently, referring to FIGS. 8 and 12, the control system 60 may operate to move the outer ring 56 upwardly, or continue moving the outer ring 50 upwardly, to contact the glass sheet G again and press a peripheral portion or portions of the glass sheet G (e.g., at an outer edge of the glass sheet G) against the upper mold 54, as shown in FIG. 12. For example, the control system 60 may operate the outer ring actuators 96 to move the outer lateral support portions 70 and 72 toward the upper mold 54 and into contact with the peripheral portions at opposite ends of the glass sheet G in order to press the peripheral portions of the glass sheet against the mold surface 64 of the upper mold 54. More specifically, referring to FIGS. 7 and 8, the outer lateral support portions 70 and 72 may be mounted on pivot links or arms 100 that are pivotally connected to the tooling frame 88, and the outer mold actuators 96 may be operated to pivot the outer lateral support portions 70 and 72 with respect to the tooling frame 88 so that the outer lateral support portions 70 and 72 contact the peripheral portions of the glass sheet G and press the peripheral portions against the mold surface 64. The actuator system 86 of the control system 60 may also or instead include one or more outer mold actuators for moving the outer longitudinal support portions 74 and 76 toward the upper mold 54 to press longitudinally extending peripheral portions of the glass sheet G against the mold surface 64. During this phase, the inner ring 58 may also be moved away from the glass sheet G (e.g., downwardly), before or after the outer lateral support portion 70 and 72 and/or the outer longitudinal support portions 74 and 76 have been pressed against the glass sheet G so that only the outer ring 56 or portions thereof is/are in contact with the glass sheet G to complete the press forming. For example, the control system 60 may operate the inner ring actuators 94 to move the inner ring 58 downwardly with respect to the outer ring 56 and the tooling frame 88. Alternatively, the inner ring 58 may remain pressed against the glass sheet G.

Next, both rings 56 and 58 may be lowered to the conveyor bed 34, and the upper mold 54 with the glass sheet G retained thereon may be moved upwardly. For example, the control system 60 may operate the first actuators 92 to move the tooling frame 88 and the rings 56 and 58 downwardly so that the rings 56 and 58 nest within the conveyor bed 34, and the control system 60 may also operate the mold actuator 98 to move the upper mold 54 upwardly. A shuttle 102 of the cooling station 16 may then be moved by an actuator 104 to move a support, such as a delivery ring 106, toward the left in FIG. 1 and below the upper mold 54. The vacuum provided by the vacuum source 68 at the mold surface 64 may then be terminated, and a supply of pressurized gas to the mold surface 64 may optionally be provided, to release the glass sheet G onto the delivery ring 106. Next, the shuttle actuator 104 may the operated by the control system 60 to move the shuttle 102 back toward the right to the position illustrated such that the delivery ring 106 and the formed glass sheet thereon are delivered for final processing such as slow cooling for annealing or more rapid cooling by air quenching for heat strengthening or tempering.

With the apparatus and method according to the disclosure, complex bent glass shapes with relatively high edge strains may be achieved, while reducing or eliminating wrinkle and/or bubble formation in the glass sheets. For example, by using outer and inner mold arrangements during forming operations, gradual multiple-stage bending (e.g., two-stage bending) of glass sheets against a mold (e.g., upper mold) may occur. As a result, bending of glass sheets may be more efficiently and effectively controlled.

The apparatus and method disclosed in this application may have particular utility with a vehicle windshield where any distortion at end portions of the windshield (i.e., glass sheet), which are mounted on front windshield pillars, and/or at an upper roof edge of the windshield and/or at a lower cowl edge of the windshield may cause optical problems. Likewise, the apparatus and method may have particular utility with backlites (e.g., rear windows) and rooflites (e.g., roof glass panels or sun roofs) for vehicles that may include complex bends. In addition, the apparatus and method may also have particular utility with any glass product having complex bends, such as glass panels for displays, instrument panel glass, solar reflector glass panels, etc.

It should be noted that movement of the rings 56 and 58 may occur in any suitable order and in any suitable manner. For example, the outer ring 56 may be used to first press one or more peripheral portions of a glass sheet against the mold surface 64 of the upper mold 54, with the inner ring 58 spaced away from the glass sheet, and then the inner ring 58 may be used to press an inner or intermediate portion of the glass sheet against the mold surface 64. Furthermore, the outer ring 56 could be moved away from the glass sheet before, during or after the above pressing step performed by the inner ring 56. In addition, the forming station 14 may include any suitable actuators for independently moving each support portion of each ring 56 and 58 so that each support portion may selectively press a corresponding portion of a glass sheet against the mold surface.

The press forming apparatus 36, including the upper mold 54, or any other suitable upper mold, and the rings 56 and 58, or other outer and inner mold arrangements according to the disclosure, may also be used in any suitable application. For example, the upper mold 54, or other suitable upper mold, and the rings 56 and 58, or other outer and inner mold arrangements according to the disclosure, may be used in a system to bend initially flat glass sheets (e.g., a system that doesn't include the roll forming station 26 or other initial forming station). As another example, the upper mold 54, or other suitable upper mold, and the rings 56 and 58, or other outer and inner mold arrangements according to the disclosure, may be used in a heated environment, such as an extension of the furnace 12. Furthermore, any of the above described methods may be practiced to bend initially flat glass sheets and/or in a heated environment. Examples of press forming in a heated environment are disclosed in U.S. Pat. No. 10,246,364, which is incorporated by reference in its entirety.

In addition, the location or proximity of the inner ring 58 with respect to the outer ring 56 may vary depending on the particular application, such as the complexity of the desired final glass shape. For example, the inner ring 58 may be positioned immediately adjacent the outer ring 56 when both rings 56 and 58 are positioned generally in a similar vertical elevation. In that regard, the support portions 78-84 of the inner ring 58 may each be positioned immediately adjacent (e.g., spaced 1 inch or less away from) a corresponding support portion 70-76 of the outer ring 56. As another example, the inner ring 58, or portion(s) thereof, may be spaced inwardly away from the outer ring 56 by any suitable distance, such as a distance in a range of greater than 1 inch to 10 inches or more, for example. In that regard, one or more of the support portions 78-84 of the inner ring 58 may be spaced away from the corresponding support portion 70-76 of the outer ring by such a distance when both rings 56 and 58 are positioned generally in a similar vertical elevation. Therefore, it is to be understood, that the relative positions of the rings 56 and 58 shown in the drawings are for illustrative purposes only.

While exemplary embodiments are described above, it is not intended that these embodiments describe all possible forms according to the disclosure. In that regard, the words used in the specification are words of description rather than limitation, and it is understood that various changes may be made without departing from the spirit and scope of the disclosure. Additionally, the features of various implementing embodiments may be combined to form further embodiments according to the disclosure.

What is claimed is:

1. A glass sheet forming station for forming a glass sheet, the forming station comprising:
    an upper mold;
    a lower outer mold arrangement including first and second outer longitudinal support portions and first and second outer lateral support portions that are each configured to contact the glass sheet;
    a lower inner mold arrangement disposed inwardly of the lower outer mold arrangement and movable relative to the lower outer mold arrangement, the lower inner mold arrangement including first and second inner longitudinal support portions and first and second inner lateral support portions that are each configured to contact the glass sheet;
    wherein the lower outer mold arrangement and the lower inner mold arrangement are each operable to press the glass sheet against the upper mold.

2. The forming station of claim 1 wherein the first and second outer longitudinal support portions and the first and second outer lateral support portions form a continuous outer ring.

3. The forming station of claim 1 wherein the first and second inner longitudinal support portions and the first and second inner lateral support portions form a continuous inner ring.

4. The forming station of claim 1 wherein at least one of the first and second outer longitudinal support portions is movable with respect to at least one of the first and second outer lateral support portions, or at least one of the first and second outer lateral support portions is movable with respect to at least one of the first and second outer longitudinal support portions.

5. The forming station of claim 4 further comprising a control system that is operable to move the at least one of the first and second outer longitudinal support portions toward the upper mold and with respect to the at least one of the first and second outer lateral support portions to press a peripheral portion of the glass sheet against the upper mold.

6. The forming station of claim 4 further comprising a control system that is operable to move the at least one of the first and second outer lateral support portions toward the upper mold and with respect to the at least one of the first and second outer longitudinal support portions to press a peripheral portion of the glass sheet against the upper mold.

7. The forming station of claim 1 wherein at least one of the first and second inner longitudinal support portions is movable with respect to at least one of the first and second inner lateral support portions, or at least one of the first and second inner lateral support portions is movable with respect to at least one of the first and second inner longitudinal support portions.

8. The forming station of claim 1 further comprising a control system that is operable to move the outer mold arrangement upwardly toward the upper mold with the glass sheet supported on the outer mold arrangement, and then subsequently move the inner mold arrangement relative to the upper mold arrangement and toward the upper mold to press the glass sheet against the upper mold.

9. The forming station of claim 8 wherein the control system is operable to move the outer mold arrangement relative to the inner mold arrangement to press a peripheral portion of the glass sheet against the upper mold after the inner mold arrangement has pressed the glass sheet against the upper mold.

10. The forming station of claim 9 wherein the control system is operable to move the inner mold arrangement downwardly before or after the outer mold arrangement has pressed the peripheral portion of the glass sheet against the upper mold.

11. The forming station of claim 10 wherein the forming station is operable to draw a vacuum at a surface of the upper mold to draw the glass sheet against the upper mold before initiation of downward movement of the inner mold arrangement.

12. The forming station of claim 1 further comprising a control system that is operable to move the outer mold arrangement upwardly toward the upper mold with the glass sheet supported on the upper mold arrangement to press a peripheral portion of the glass sheet against the upper mold, and then subsequently move the inner mold arrangement relative to the upper mold arrangement and toward the upper mold to press an inner portion of the glass sheet against the upper mold.

13. The forming station of claim 1 wherein, for the outer mold arrangement, at least one of the first and second outer longitudinal support portions has a width that is different than a width of at least one of the first and second outer lateral support portions, or, for the inner mold arrangement, at least one of the first and second inner longitudinal support portions has a width that is different than a width of at least one of the first and second inner lateral support portions.

14. A glass sheet forming station for forming a glass sheet, the forming station comprising:
   an upper mold;
   a lower outer ring including first and second outer end portions and first and second outer intermediate portions positioned between the outer end portions, wherein the outer end portions and the outer intermediate portions are each configured to contact the glass sheet; and
   a lower inner ring disposed inwardly of the lower outer ring and movable relative to the lower outer ring, the lower inner ring including first and second inner end portions and first and second inner intermediate portions positioned between the inner end portions, wherein the inner end portions and the inner intermediate portions are each configured to contact the glass sheet;
   wherein the lower outer ring and the lower inner ring are each operable to press the glass sheet against the upper mold.

15. A method for forming a glass sheet, the method comprising:
   pressing the glass sheet against a mold using an outer mold arrangement having first and second outer end support portions and first and second outer intermediate support portions positioned between the outer end support portions; and
   pressing the glass sheet against the mold using an inner mold arrangement that is disposed inwardly of the outer mold arrangement and movable relative to the outer mold arrangement, the inner mold arrangement having first and second inner end support portions and first and second inner intermediate support portions positioned between the inner end support portions.

16. The method of claim 15 wherein pressing the glass sheet against the mold using the outer mold arrangement occurs prior to pressing the glass sheet against the mold using the inner mold arrangement.

17. The method of claim 15 wherein pressing the glass sheet against the mold using the inner mold arrangement occurs prior to pressing the glass sheet against the mold using the outer mold arrangement.

18. The method of claim 15 wherein the first and second outer end support portions and the first and second outer intermediate support portions form a continuous outer ring and/or the first and second inner end support portions and the first and second inner intermediate support portions form a continuous inner ring.

19. The method of claim 15 further comprising contacting the glass sheet with the outer mold arrangement and moving the glass sheet upwardly toward the mold using the outer mold arrangement, while the inner mold arrangement is spaced away from the glass sheet.

20. The method of claim 19 further comprising moving the inner mold arrangement upwardly with respect to the outer mold arrangement to lift the glass sheet off of the outer mold arrangement after the glass sheet has been moved upwardly toward the mold, wherein pressing the glass sheet against the mold using the inner mold arrangement occurs with the outer mold arrangement spaced away from the glass sheet.

21. The method of claim 20 wherein pressing the glass sheet against the mold using the outer mold arrangement comprises pressing a peripheral portion of the glass sheet against the mold after the inner mold arrangement has pressed the glass sheet against the mold.

22. The method of claim 21 further comprising moving the inner mold arrangement downwardly before or after the outer mold arrangement has pressed the peripheral portion of the glass sheet against the mold.

23. The method of claim 22 further comprising applying a vacuum at a surface of the mold to draw the glass sheet against the mold after initiation of downward movement of the inner mold arrangement.

\* \* \* \* \*